(12) United States Patent
Garg et al.

(10) Patent No.: US 10,191,859 B2
(45) Date of Patent: Jan. 29, 2019

(54) MEMORY ACCESS PROTECTION APPARATUS AND METHODS FOR MEMORY MAPPED ACCESS BETWEEN INDEPENDENTLY OPERABLE PROCESSORS

(71) Applicant: Apple Inc., Cupertino, CA (US)

(72) Inventors: Saurabh Garg, Cupertino, CA (US); Karan Sanghi, Cupertino, CA (US); Vladislav Petkov, Cupertino, CA (US); Haining Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/271,109

(22) Filed: Sep. 20, 2016

(65) Prior Publication Data

US 2017/0286323 A1    Oct. 5, 2017

Related U.S. Application Data

(60) Provisional application No. 62/316,326, filed on Mar. 31, 2016.

(51) Int. Cl.
*G06F 12/00* (2006.01)
*G06F 12/14* (2006.01)
*G06F 12/1081* (2016.01)

(52) U.S. Cl.
CPC ...... *G06F 12/1441* (2013.01); *G06F 12/1081* (2013.01); *G06F 2212/1052* (2013.01)

(58) Field of Classification Search
CPC ................ G06F 21/6218; G06F 2212/1052
See application file for complete search history.

(56) References Cited

U.S. PATENT DOCUMENTS

| | | | |
|---|---|---|---|
| 3,931,566 A | 1/1976 | Pask et al. | |
| 4,714,808 A | 12/1987 | Brolin | |
| 4,805,137 A | 2/1989 | Grant et al. | |
| 4,978,829 A | 12/1990 | Gurwicz | |
| 5,146,198 A | 9/1992 | Pollard et al. | |
| 5,399,825 A | 3/1995 | Valenzuela | |
| 5,467,459 A * | 11/1995 | Alexander | G06F 12/0864 345/544 |
| 5,475,297 A | 12/1995 | Kaneko | |
| 5,708,779 A * | 1/1998 | Graziano | G06F 13/128 709/250 |
| 5,903,564 A | 5/1999 | Ganmukhi et al. | |
| 5,991,169 A | 11/1999 | Kooken | |
| 6,523,073 B1 | 2/2003 | Kammer et al. | |
| 6,639,781 B2 | 10/2003 | Smith et al. | |
| 6,774,758 B2 | 8/2004 | Gokhale et al. | |
| 6,922,883 B2 | 8/2005 | Gokhale et al. | |

(Continued)

*Primary Examiner* — Tuan Thai
*Assistant Examiner* — Tasnima Matin
(74) *Attorney, Agent, or Firm* — Gazdzinski & Associates, PC (57) ABSTRACT

Methods and apparatus for providing access to a shared memory resource. In one embodiment, a first processor generates a first window register associated with the shared memory resource; and transmits the first window register from the first processor to a second processor, the first window register defining a first extent of address space within the shared memory resource that is directly accessible by the second processor without requiring a performance of arbitration operations by the first processor.

17 Claims, 6 Drawing Sheets

(56) References Cited

U.S. PATENT DOCUMENTS

| | | | |
|---|---|---|---|
| 6,958,666 B2 | 10/2005 | Begon et al. | |
| 6,965,290 B2 | 11/2005 | Gokhale et al. | |
| 7,489,219 B2 | 2/2009 | Satardja | |
| 7,509,391 B1 * | 3/2009 | Chauvel | G06F 12/1027 709/213 |
| 7,535,187 B2 | 5/2009 | Carstensen | |
| 7,685,476 B2 | 3/2010 | Andre et al. | |
| 7,849,586 B2 | 12/2010 | Sutardja | |
| 7,915,993 B2 | 3/2011 | Liu et al. | |
| 8,032,082 B2 | 10/2011 | Boguslavskij et al. | |
| 8,089,333 B2 | 1/2012 | MacLennan | |
| 8,102,233 B2 | 1/2012 | Ikriannikov | |
| 8,203,411 B2 | 6/2012 | MacLennan | |
| 8,279,037 B2 | 10/2012 | Yan et al. | |
| 8,294,544 B2 | 10/2012 | Ikriannikov et al. | |
| 8,352,624 B2 | 1/2013 | Zimmerman et al. | |
| 8,354,624 B2 | 1/2013 | Schildt | |
| 8,624,702 B2 | 1/2014 | MacLennan et al. | |
| 8,635,412 B1 * | 1/2014 | Wilshire | G06F 15/167 711/118 |
| 8,819,386 B1 | 8/2014 | Mather | |
| 9,170,957 B2 | 10/2015 | Touzni et al. | |
| 2002/0013868 A1 * | 1/2002 | West | G06F 8/457 710/23 |
| 2003/0014607 A1 | 1/2003 | Slavin et al. | |
| 2003/0200413 A1 | 10/2003 | Gurumoorthy et al. | |
| 2005/0012583 A1 | 1/2005 | Sutardja et al. | |
| 2006/0107071 A1 | 5/2006 | Girish et al. | |
| 2006/0114093 A1 | 6/2006 | Sutardja et al. | |
| 2007/0005869 A1 * | 1/2007 | Balraj | G06F 9/4401 711/2 |
| 2007/0180041 A1 * | 8/2007 | Suzuoki | H04L 67/1097 709/207 |
| 2007/0226417 A1 | 9/2007 | Davis | |
| 2008/0183931 A1 | 7/2008 | Verm et al. | |
| 2009/0113141 A1 * | 4/2009 | Bullman | G06F 11/004 711/147 |
| 2010/0214050 A1 | 8/2010 | Opina, Jr. et al. | |
| 2011/0029696 A1 * | 2/2011 | Uehara | G06F 13/387 710/9 |
| 2011/0035575 A1 | 2/2011 | Kwon | |
| 2011/0083002 A1 | 4/2011 | Albers et al. | |
| 2012/0072658 A1 | 3/2012 | Hashimoto et al. | |
| 2013/0290947 A1 | 10/2013 | Li | |
| 2014/0173236 A1 * | 6/2014 | Kegel | G06F 12/1441 711/163 |
| 2014/0189057 A1 | 7/2014 | Sankoda et al. | |
| 2015/0212806 A1 | 7/2015 | Hsieh | |
| 2016/0103480 A1 | 4/2016 | Sanghi et al. | |
| 2016/0103689 A1 | 4/2016 | Sanghi et al. | |
| 2016/0103743 A1 | 4/2016 | Sanghi et al. | |

\* cited by examiner

MEMORY ACCESS PROTECTION APPARATUS AND METHODS FOR MEMORY MAPPED ACCESS BETWEEN INDEPENDENTLY OPERABLE PROCESSORS

PRIORITY

This application claims priority to U.S. Provisional Patent Application Ser. No. 62/316,326 filed Mar. 31, 2016 titled "MEMORY ACCESS PROTECTION APPARATUS AND METHODS", the foregoing being incorporated herein by reference in its entirety.

RELATED APPLICATIONS

This application is related to commonly owned and co-pending U.S. patent application Ser. No. 15/271,102 entitled "MEMORY ACCESS PROTECTION APPARATUS AND METHODS" filed contemporaneously herewith on Sep. 20, 2016, the foregoing being incorporated herein by reference in its entirety.

This application is also related to commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015, Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS", filed Oct. 8, 2015, Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed Oct. 8, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The disclosure relates generally to the field of electronics devices, as well as networks thereof. More particularly, in one exemplary aspect, the disclosure is directed to methods and apparatus for memory access protection between processors with shared memory resources.

DESCRIPTION OF RELATED TECHNOLOGY

The consumer electronics industry continuously strives to meet consumer demands for increased device functionality. In order to keep costs low and maximize supply chain diversity, most manufacturers design their consumer electronics devices to be constructed from generic and/or commodity components that are sourced from a number of $3^{rd}$ party vendors. Thus, manufacturers have historically struggled to implement an increasing set of features on embedded platforms where components are sub-optimal (e.g., low memory resources, etc.). Additionally, processor architectures have evolved to include multiple processors from multiple sources within a single device.

More recently, many extant consumer devices commonly include both an application processor as well as one or more peripheral chipsets. Furthermore, these disparate processors have evolved towards the use of a shared memory mapped bus interface. As a result of this evolution, peripheral chipsets commonly have access to host memory (e.g., random access memory (RAM) technologies including dynamic RAM (DRAM)). Accordingly, when a peripheral chipset attempts to access an illegal address in host memory, it can result in various violations which ultimately can result in, for example, kernel panic situations thus resulting in undesirable device operation such as, for example, a reboot of the entire system.

Over time, it has been determined that the logging of these violations (e.g., in kernel panic logs) are not always adequate in determining the root cause or issue which resulted in the undesirable device operation. To these ends, improved methods and apparatus are needed for hardware solutions that guard against illegal host memory accesses, thereby improving upon perceived product quality as well as improving upon user experiences with these devices.

SUMMARY

The present disclosure satisfies the foregoing needs by providing, inter alia, methods and apparatus for guarding against illegal host memory accesses.

In a first aspect, a method for providing access to a shared memory resource is disclosed. In one embodiment, the method includes: generating, by a first processor, a first window register associated with the shared memory resource; and transmitting the first window register from the first processor to a second processor, the first window register defining a first extent of address space within the shared memory resource that is directly accessible by the second processor without requiring a performance of arbitration operations by the first processor.

In a first variant, the generation of the first window register includes generating, by the first processor, a base address that corresponds to a starting location within the shared memory resource; and generating, by the first processor, a window length that corresponds to the first extent of address space within the shared memory resource from the starting location within the shared memory resource.

In another variant, the generation of the window register comprises generating the window register upon occurrence of a predefined event.

In yet another variant, the predefined event includes a second processor boot process.

In yet another variant, the method further includes generating, by the first processor, a second window register associated with the shared memory resource; and transmitting the second window register from the first processor to the second processor, the second window register defining a second extent of address space within the shared memory resource that is directly accessible by the second processor without requiring the performance of arbitration operations by the first processor.

In yet another variant, responsive to an attempt to access an extent of address space outside of the extent of accessible address space, receiving a nullified packet transmitted by the second processor.

In yet another variant, the reception of the nullified packet by the first processor, further includes receiving an inverted data link layer cyclic redundancy check (LCRC) value for the nullified packet.

In yet another variant, the method further includes upon reception of the nullified packet by the first processor, disregarding the nullified packet.

In a second aspect, a method for registering access violations of host memory is disclosed. In one embodiment, the method includes receiving one or more window registers defining an extent of address space within the host memory that is accessible by a peripheral processor from a host processor; responsive to an attempt to access an extent of address space outside of the extent of accessible address space, generating an error message by the peripheral processor; storing the error message within a violation register; and preventing access of the host memory by the peripheral processor until the host processor has cleared the error message.

In one variant, the generation of the error message includes: generating a memory address for the extent of address space outside of the extent of accessible address space; generating a source for the attempt to access the extent of address space outside of the extent of accessible address space; and generating a violation type for the attempt to access the extent of address space outside of the extent of accessible address space.

In another variant, the method includes the generation of the violation type that includes determining whether an access violation comprises a write violation or a read violation.

In yet another variant, the generation of the source includes determining one of a direct memory access (DMA) unit or a central processing unit (CPU) as the source of an illegal access attempt.

In yet another variant, the generation of the memory address includes: determining whether a start address for the memory address falls outside the extent of accessible address space; and determining whether an end address for the memory address falls outside the extent of accessible address space.

In yet another aspect, the prevention of access to the host memory includes: generating a nullified packet by the peripheral processor; and transmitting the nullified packet to the host processor.

In yet another aspect, the generation of the nullified packet by the peripheral processor further includes generating an inverted data link layer cyclic redundancy check (LCRC) value for the nullified packet.

In a third aspect, a method for handling detected violations of host memory is disclosed. In one embodiment, the method includes detecting a violation of access of a defined extent of address within host memory; storing a violation message within a violation register; and transmitting a nullified packet in response to the detection of the violation.

In a fourth aspect, a memory mapped system is disclosed. In one embodiment, the memory mapped system includes a host processor and one or more peripheral processors. In a variant, the memory mapped system is configured to register access violations of host memory. In another variant, the memory mapped system is configured to handle detected violations of host memory.

In a fifth aspect, host memory access protection registers are disclosed. In one embodiment, the host memory access protection registers includes a window register, a window configuration register and a violation register.

In a sixth aspect, a computer readable medium is disclosed. In one embodiment, the computer readable medium includes a non-transitory storage medium having one or more computable executable instructions stored thereon, the one or more instructions when executed configured to: receive one or more window registers defining an extent of address space within a host memory that is accessible by a peripheral processor from a host processor; generate an error message responsive to an attempt to access an extent of address space outside of the extent of accessible address space; store the error message within a violation register; and prevent access of the host memory by the peripheral processor until the host processor has cleared the error message.

In a seventh aspect, a peripheral processor is disclosed. In one embodiment, the peripheral processing device is configured to access host memory within a memory mapped system and includes: a peripheral CPU, a peripheral MMU, peripheral memory and a peripheral direct memory access (DMA) unit and further includes logic configured to: receive a first window register from a host processing device, the first window register defining a first extent of address space within the host memory resource that is directly accessible by the peripheral processing device without requiring a performance of arbitration operations by the host processing device.

In one variant, the peripheral processing device further includes logic configured to: expose a capability register which the host processing device can access, the capability register comprising a windows enabled field and a windows available field.

In yet another variant, the peripheral processing device further includes logic configured to: write a first value into the windows available field, the first value comprising a maximum number of windows supported by the peripheral processing device.

In yet another variant, the peripheral processing device further includes logic configured to: read a second value from the windows enabled field, the second value indicating to the peripheral processing device a number of windows enabled by the host processing device.

In another embodiment, the peripheral processor is configured to register access violations of host memory within a memory mapped system, the peripheral processing device further including a peripheral CPU, a peripheral MMU, peripheral memory and a peripheral direct memory access (DMA) unit and further comprising logic configured to: receive one or more window registers defining an extent of address space within the host memory that is accessible by the peripheral processor from a host processor; generate an error message responsive to an attempt to access an extent of address space outside of the extent of accessible address space; store the error message within a violation register; and prevent access of the host memory by the peripheral processor until the host processor has cleared the error message.

In one variant, the prevention of access to the host memory includes the generation of a nullified packet by the peripheral processor and transmission of the nullified packet to the host processor.

In another variant, the generation of the nullified packet by the peripheral processing device further includes generation of an inverted data link layer cyclic redundancy check (LCRC) value for the nullified packet.

In yet another variant, the generation of the error message includes a generation of a memory address for the extent of address space outside of the extent of accessible address space; a generation of a source for the attempt to access the extent of address space outside of the extent of accessible address space; and a generation of a violation type for the attempt to access the extent of address space outside of the extent of accessible address space.

In yet another variant, the generation of the source includes the determination of one of the peripheral DMA or the peripheral CPU as the source of an illegal access attempt.

In an eighth aspect, a host processor is disclosed. In one embodiment, the host processor is configured to define one or more window registers containing the extent of address space within a host memory that is accessible by a peripheral processing device; and transmit the one or more window registers to the peripheral processing device.

In one variant, the one or more window registers is defined by the host processor during a boot process for the memory mapped system.

In another variant, each of the one or more window registers comprises both a base address and a window length, the base address and the window length configured to define an address space within the host memory that are to be accessible by the peripheral processing device.

In yet another variant, the memory mapped system further includes a window configuration register, the window configuration register configured to be read and/or written by the host processor and the peripheral processing device.

In yet another variant, the window configuration register further includes an available window field and the peripheral processing device is further configured to write a value into the available window field; and wherein the host processor is further configured to read the value in the available window field, the read value being utilized by the host processor in order to determine whether the host processor should write a value to a windows enabled field of the window configuration register.

In yet another variant, the host processor is further configured to write a default value to the windows enabled field of the window configuration register, the default value being indicative of a legacy peripheral processing device that is incompatible with support of the one or more window registers.

In yet another variant, the host processor is further configured to write to one or more locking bits of the window configuration register, the one or more locking bits configured to prevent the update of any fields located within the one or more window registers.

In a ninth aspect, a computing device is disclosed. In one embodiment, the computing device includes a host processing device comprising a host CPU and a host memory management unit (MMU); a peripheral processing device comprising a peripheral CPU, a peripheral MMU, peripheral memory and a peripheral direct memory access (DMA) unit; and a host memory accessible by both the host processing device and the peripheral processing device. The host processing device further includes logic configured to: generate a first window register associated with the host memory; and transmit the first window register from the host processing device to the peripheral processing device, the first window register defining a first extent of address space within the host memory that is directly accessible by the peripheral processing device without requiring a performance of arbitration operations by the host processing device.

In one variant, the host processing device further includes logic configured to prevent access of the first extent of address space within the host memory by the host processing device.

In another variant, the first window register is defined by the host processing device during a boot process for the memory mapped system.

In yet another variant, the first window register includes both a base address and a window length, the base address and the window length configured to define the first extent of address space within the host memory.

In yet another variant, the memory mapped system further includes a window configuration register, the window configuration register configured to be read and/or written by the host processing device and the peripheral processing device.

In yet another variant, the window configuration register further includes an available window field and the peripheral processing device is further configured to write a value into the available window field; and the host processing device is further configured to read the value in the available window field, the read value being utilized by the host processing device in order to determine whether the host processing device should write a value to a windows enabled field of the window configuration register.

In yet another variant, the host processing device is further configured to write a default value to the windows enabled field of the window configuration register, the default value being indicative of a legacy peripheral processing device that is incompatible with support of the one or more window registers.

In yet another variant, the host processing device is further configured to write to one or more locking bits of the window configuration register, the one or more locking bits configured to prevent the update of any fields located within one or more window registers.

In another embodiment, the computing device includes a memory mapped system and further includes a host processing device having a host CPU and a host memory management unit (MMU); a peripheral processing device having a peripheral CPU, a peripheral MMU, peripheral memory and a peripheral direct memory access (DMA) unit; and a host memory accessible by both the host processing device and the peripheral processing device. The peripheral processing device further comprises logic configured to: receive one or more window registers defining an extent of address space within the host memory that is accessible by the peripheral processing device from the host processing device; generate an error message responsive to an attempt to access an extent of address space outside of the extent of accessible address space; store the error message within a violation register located within the peripheral memory; and prevent access of the host memory by the peripheral processing device until the host processing device has cleared the error message.

Other features and advantages of the present disclosure will immediately be recognized by persons of ordinary skill in the art with reference to the attached drawings and detailed description of exemplary embodiments as given below.

All Figures © Copyright 2015-2016 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of detecting and registering host memory access violations by peripheral chipset manufacturers, it will be recognized by those of ordinary skill that the present disclosure is not so limited. In fact, the various aspects of the disclosure are useful for detecting and registering host memory access violations by the applications processor. Further, while the following embodiments describe specific implementations of e.g., dedicated address spaces, dedicated violation registers, and specific protocols, those of ordinary skill in the related arts will readily appreciate that such descriptions are purely illustrative of the broader principles described herein.

Moreover, while embodiments described herein are primarily discussed in the context of an inter-processor communication (IPC) link, it will be recognized by those of ordinary skill that the present disclosure is not so limited. In fact, the various aspects of the disclosure are useful in any device or network of devices that may benefit from providing memory access protection for memory-mapped architectures, as is disclosed herein. Further, while the following embodiments describe specific implementations of e.g., dedicated address spaces, legacy support capabilities, and specific protocols, those of ordinary skill in the related arts will readily appreciate that such descriptions are purely illustrative.

Exemplary Processor and Memory Architecture

Figure 1:
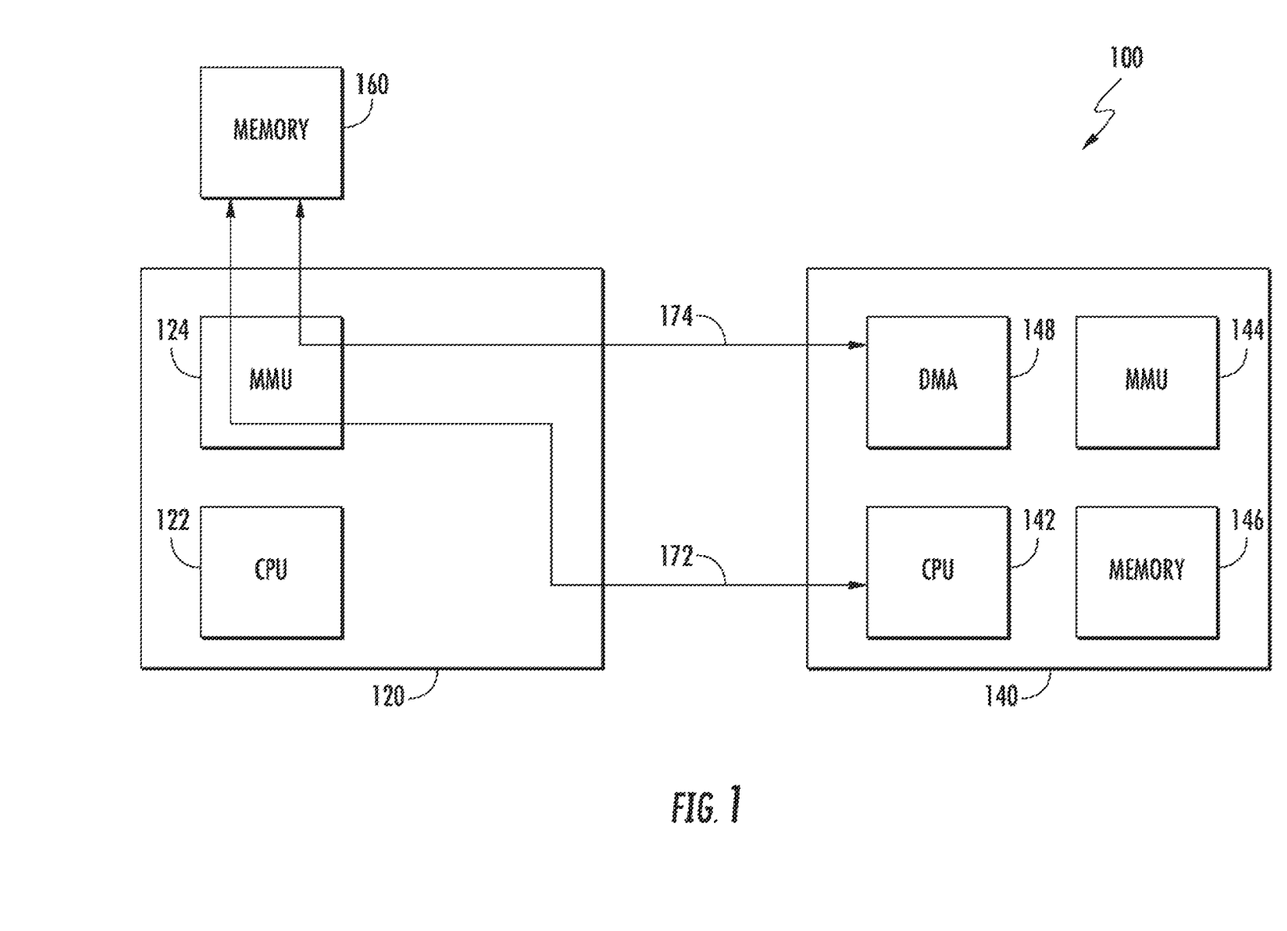
FIG. 1 is a system block diagram illustrating various basic building blocks associated with a memory mapped system in accordance with the principles of the present disclosure.

Referring now to FIG. 1, an exemplary memory mapped system 100 is shown and described in detail. The memory mapped system 100 may be included in any number of consumer electronic devices including, for example, smart phone devices (such as, without limitation, the iPhone), personal media devices (such as, without limitation, the iPad/iPod), personal computing devices (such as, without limitation, the MacBook Pro and MacBook Air) and literally any other computing device having a host processor, one or more peripheral processors, and a shared memory. Artisans of ordinary skill in the related arts will readily appreciate that memory-mapped architectures may be beneficial to increase performance speeds and/or to optimize operation between processors. However, memory-mapped architectures may also introduce unexpected problems, for example when a first processor behaves unexpectedly, the first processor could directly write into the memory space of the second processor, thereby corrupting the second processor's operation, etc.

The system includes, in the illustrated embodiment, host memory 160 which may include either volatile (e.g., DRAM, etc.) or non-volatile memory (e.g., non-volatile RAM (NVRAM), etc., as well as a host processor 120 (e.g., an applications processor (AP)) and a peripheral processor 140 or peripheral chipset. The following discussions will be described in reference to a "host" processor, and a "peripheral" (or "peripheral device") processor. For reasons which will become apparent below, it is appreciated that the designation as to host or peripheral processor is used to simplify and/or clarify the following explanations, and does not imply existing host or peripheral functionality, or that such roles cannot be reversed.

While illustrated in the context of a system having a single host processor and a single peripheral processor, it is readily appreciated that embodiments are envisioned herein that include additional processing chipsets (e.g., additional peripheral processors). The host processor 120 includes a central processing unit (CPU) 122 as well as a memory management unit (MMU) 124 in the illustrated embodiment, while the peripheral processor 140 includes a CPU 142, a MMU 144 as well as memory 146 and a direct memory access (DMA) unit 148. As is shown, the peripheral processor can access host memory 160 via a CPU access over a first communications link 172 or via DMA access over a second communications link 174.

Figure 1A:
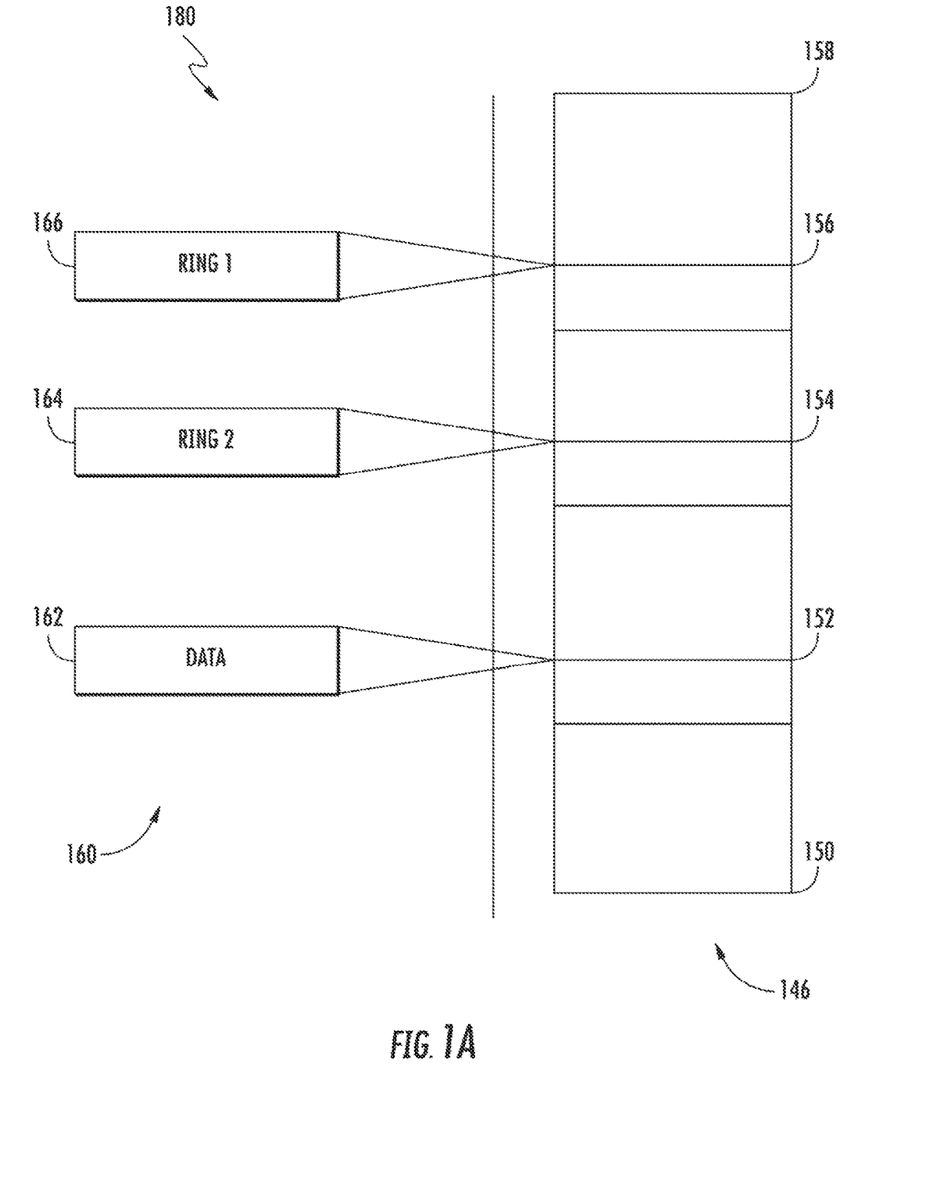
FIG. 1A is a block diagram illustrating host memory as seen by a peripheral processor in accordance with the principles of the present disclosure.

In one exemplary embodiment, host memory 160 is accessible to the peripheral processor via a peripheral memory map representation 146, as shown in FIG. 1A. Host software defines several data structures (e.g., ring data structures 164, 166, data structures 162, etc.) within the host memory and updates peripheral memory/registers with the addresses of these data structures. The peripheral processor then maps these address ranges at various base addresses in its own memory map 146. For example, and as illustrated in FIG. 1A, peripheral memory 146 includes a starting address 150 (e.g., 0x0000000000000000) as well as an end address 158 (e.g., 0xFFFFFFFFFFFFFFFF). Within this peripheral memory, several base addresses have been allocated for, and correspond to, data structures contained within host memory. For example, base address 152 refers to data structure 162 within host memory; base address 154 refers to ring structure 164 within host memory; while base address 156 refers to ring structure 166 within host memory. By defining these base addresses in peripheral memory, the peripheral processor CPU 142 or DMA 148 may directly access these data structures (e.g., without requiring the host processor to perform arbitration operations) using communication links 172, 174, respectively. While the peripheral processor in FIG. 1 is illustrated as having access to host memory via CPU 142 or DMA 148, it is appreciated that more access pathways (e.g., via the addition of an additional DMA unit, etc.) or less (e.g., via only the CPU) are also readily envisioned.

In one exemplary implementation, the peripheral processor maps these data structures as part of the peripheral boot process, although it is appreciated that the memory mapping between data structures in host memory and peripheral memory can occur at during normal operation. For example, firmware and/or software applications may dynamically allocate and/or de-allocate memory windows between the host and peripheral processors so as to facilitate data transactions with minimal overhead. Common examples of memory mapped access include without limitation, e.g., device driver allocations, mailbox allocations, bulk memory transfers, etc.

HMAP Registers

Exemplary embodiments of the HMAP registers are now described in detail. While these embodiments are primarily discussed in the context of being stored within dedicated hardware registers, it will be recognized that the present disclosure is not so limited. For example, artisans of ordinary skill in the related arts, given the contents of the present disclosure, will readily appreciate that register locations may be virtualized and/or mapped to memory locations within e.g., the peripheral memory management unit (MMU) 144, the host MMU 124, the peripheral memory 146, and/or the host memory 160, etc. In fact, the various HMAP registers described herein may be stored anywhere within the memory mapped system 100 with equivalent success.

Additionally, while primarily discussed in the context of a specific ordering for fields located within individual ones of these HMAP registers, it is appreciated that the specific ordering of these fields is not important. For example, and referring to FIG. 2C, while the HMAP violation register 240 is described in the context of having the violation type field 246 and violation source field 248 resident next to one another within this HMAP violation register, it is appreciated that the specific ordering of these fields within a given register may be modified. These and other embodiments would be readily appreciated by one or ordinary skill given the contents of the present disclosure.

Figure 2A:
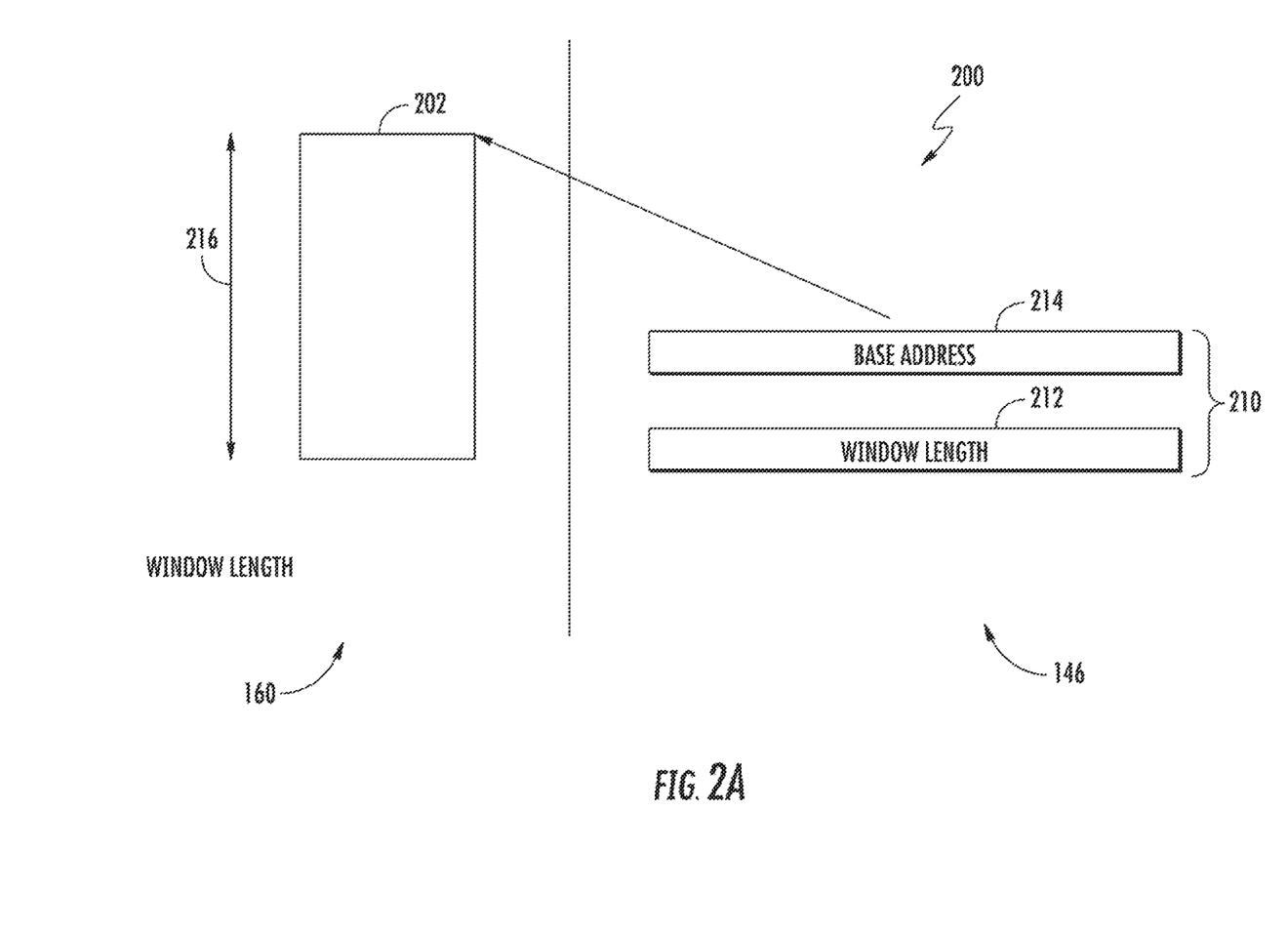
FIG. 2A is a block diagram illustrating a host memory access protection (HMAP) window register for use with the memory mapped system illustrated in FIG. 1.

Referring now to FIG. 2A, an exemplary implementation for an HMAP windowing system 200 is shown and described in detail. For example, upon a predefined event (e.g., during the boot process for the memory mapped system 100, a boot process for the peripheral processor, a boot process for the host processor, etc.), the host software determines what locations in host memory 160 will become accessible to the peripheral processor by writing to so-called HMAP window register(s) 210. For example, in one exemplary embodiment, the peripheral processor exposes "N" number of 128-bits' of HMAP window register space. Each of these HMAP window registers 210 consists of a base address 214 that corresponds to a base address 202 in host memory 160. Moreover, each of these HMAP window registers consists of a window length 212 that corresponds to a window length 216 of host memory accessible by the peripheral. By exposing these HMAP window registers to host software, host software can define the extent of host memory accessible to the peripheral processor.

Optionally, or alternatively, the peripheral software alone or in combination with the host software, may define what locations in host memory are accessible by writing to these HMAP window registers. For example, in some embodiments, the peripheral chipset may implement even stricter host memory access windows than the host's default settings. Stricter windowing can further minimize accesses to the host memory in the event of a trap or crash. In this manner, the peripheral software can guarantee that no host memory would be touched by any DMA engines subsequent to the trap or crash. In another example, the peripheral chipset may require more memory than the host has provided; in such cases, the peripheral may request more memory (and responsively the host may determine how much (if any) additional memory can be allocated to the peripheral). Still other variants may be implemented with equivalent success by artisans of ordinary skill in the related arts, given the contents of the present disclosure.

In the context of an exemplary 128-bit implementation, the first 64-bits of the HMAP window register define the base address 202 for an accessible portion of host memory. In one or more implementations, the base address is aligned to 4K for easier hardware implementation. In some embodiments, the HMAP window registers can only be written by the host processor; in other embodiments, the HMAP window registers may also be written by the peripheral processor, or alternatively, only be written via the peripheral processor. In implementations in which the base address field 214 can only be written by one of the processors (e.g., the peripheral or the host), mechanisms for identifying improper write attempts to the HMAP window register fields can be flagged and logged (see the discussion of the HMAP violation registers discussed infra).

The following 32-bits (i.e., the window length field 212) are reserved for defining the window length 216 of accessible space in host memory. Similar to the discussion of the base address field 214, the window length field can be defined by host software running on the host processor and optionally, or alternatively, be defined by peripheral software running on the peripheral processor. In one or more implementations, the window size defined by the window length field 212 will only occur in multiples of 512-bytes in order to facilitate easier hardware implementation. As the length of the window length field in this example embodiment is 32-bits, the largest window length in host memory is defined as $2^{32}$ bits in length minus a reset value that is defined in an exemplary implementation as '0' (i.e., a maximum window length of 4,294,967,295 within the 128-bit host memory space). The use of a set reset value (e.g., zero (0)) enables, inter alia, the HMAP window register to be updated and/or reset. For example, by setting the window length field 212 to '0', the base address field 214 can be subsequently updated and a new window length field 212 can be set.

As a brief aside, the aforementioned embodiments use a 4K alignment for the base and require window sizes to be a multiple of 512-bytes so as to allow the hardware implementation to ignore the low 9 bits of an address when checking whether it falls within a window. The exemplary sizes are selected to optimize a specific hardware implementation (e.g., the hardware check can be performed faster and/or manufactured more cheaply). A person having ordinary skill in the related arts, given the contents of the present disclosure, may readily apply the principles described herein to implementations with different alignments, window sizes and/or addressing schemes, the foregoing being purely illustrative.

Figure 2B:
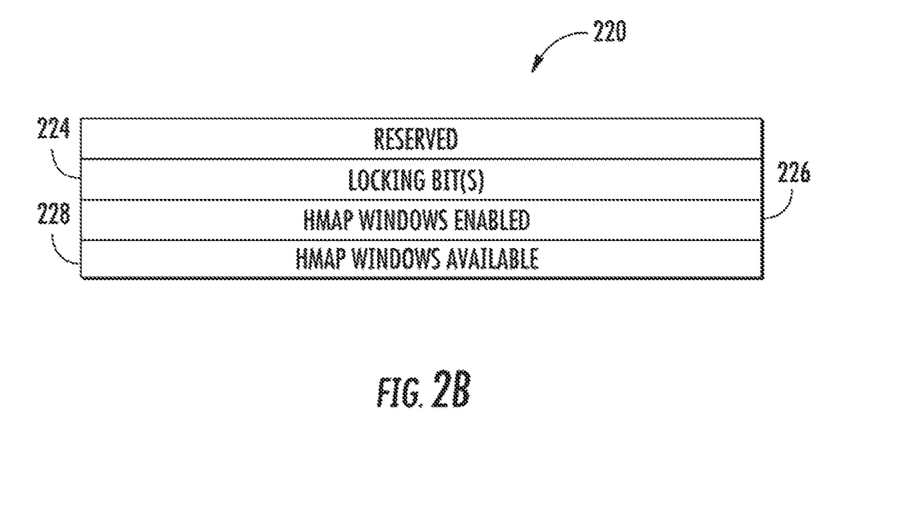
FIG. 2B is a block diagram illustrating a HMAP window configuration register for use with the memory mapped system illustrated in FIG. 1.

Referring now to FIG. 2B, an exemplary implementation for an HMAP window configuration register 220 is shown and described in detail. In one exemplary implementation, various portions of the HMAP window configuration register 220 can be read and/or written by the host and peripheral processors. In one exemplary embodiment, the peripheral hardware can set the maximum number of HMAP windows that are supported/available by writing to the HMAP available window field 228. The host processor can read the HMAP available window field 228 register, and decide whether to enable windows and/or how many windows to enable. The host software can enable a number of HMAP windows by writing to the HMAP windows enabled field 226. In some cases, a default value of '0' means that HMAP window registers are not used, or alternatively, that this feature is disabled, in order to keep the hardware compatible with software implementations that don't support HMAP functionality. The HMAP window configuration register also includes a locking bit(s) field 224. The purpose of this locking bit(s) field is to freeze the state of the HMAP windows register 210 in order to prevent the updating of any of the fields located within these HMAP windows register(s).

In the context of an exemplary 32-bit implementation for the HMAP window configuration register 220, the first 8-bits are reserved for the so-called HMAP windows available field 228. In one embodiment, the peripheral processor defines the number of windows that are available, while the host processor accesses this register field 228 in order to determine the number of windows currently available. The following 8-bits are reserved for the so-called HMAP windows enabled field 226. In one embodiment, the host processor writes this register in order to program the number of windows that have been enabled by the host processor. Moreover, by specifying a reset value of, for example, '0', this enables the peripheral processor (and the host processor) to determine when the HMAP window register functionality has been disabled. The following bit indicates the locking bit field 224 for the HMAP window configuration register. For example, in one embodiment, a value of '1' within this locking bit field 224 indicates to the peripheral processor that any attempted writes to the HMAP window register 210 is an error. In other words, the purpose of the locking bit field is to freeze the state of the programmed window registers 210 and trap any further accesses. In one or more implementations, the host processor has exclusive access to change the value of this field in order to ensure that it has exclusive control over the creation/modification of HMAP window registers 210.

Figure 2C:
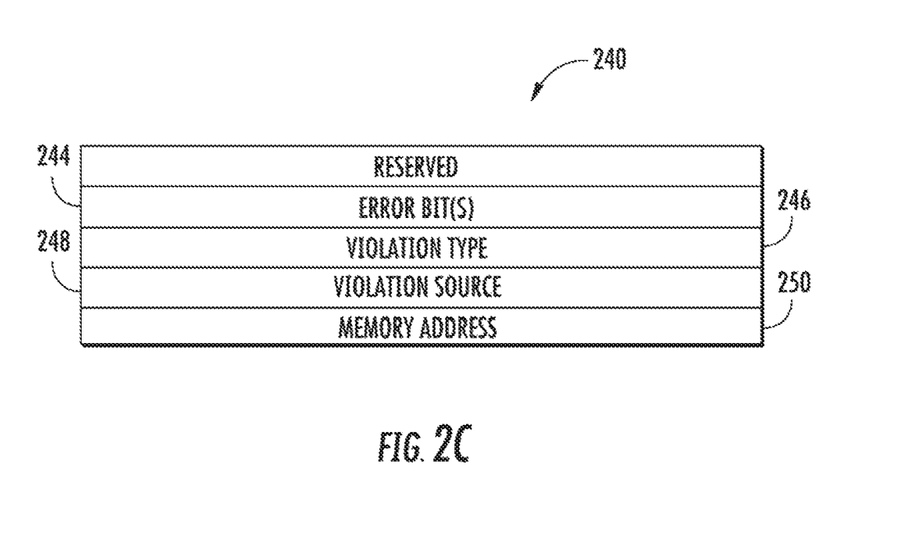
FIG. 2C is a block diagram illustrating a HMAP violation register for use with the memory mapped system illustrated in FIG. 1.

Referring now to FIG. 2C, an exemplary implementation for an HMAP violation register 240 is shown and described in detail. Since one exemplary purpose of these HMAP registers 210, 220, 240 is to protect against and identify illegal access to host memory 160, these registers may be designated for specific use or common use. More directly, while the present disclosure describes a single set of registers that control and configure a common set of window ranges, it is readily appreciated that in other embodiments, multiple distinct sets of registers may be used to specify controlled ranges for different software applications etc. In other words, if a peripheral device has multiple DMA units and/or multiple CPUs, the various DMA units and/or CPUs may have differing constraints consistent with different window configuration registers.

In one exemplary implementation, once host software has enabled the HMAP window registers, the peripheral processor detects HMAP violations and updates the HMAP violation register whenever an access is made to host memory that is outside of the defined protected range. More directly, the peripheral processor can readily monitor its own transactions; transactions that fall outside the defined protected range are assumed to be errant accesses due to corrupted software execution, etc. In this manner, error detection and recovery can be handled and prevented directly by the peripheral processor (rather than the host processor which is unaware of the peripheral processor's independent operation).

Moreover, in one or more embodiments, the peripheral processor will not generate any bus-level packets when it detects a violation until the detected violation is later cleared by the host processor. Violations are flagged for the host processor within the HMAP violation register. The HMAP violation register consists of a number of fields including a memory address field 250, a violation source field 248, a violation type field 246, an error bit(s) field 244.

In the context of an exemplary 128-bit implementation for the HMAP violation register 240, the memory address field 250 consists of 64-bits that are indicative of the memory address of host memory that was caught during an attempted access outside of the range of addresses defined by the HMAP window registers. The subsequent 16-bits represent the violation source field 248 which defines the source of the attempted access violation. For example, in one exemplary implementation, a value of '1' is indicative of an attempted rewrite of a window register 210 when the locking bit(s) field 224 of the HMAP configuration register 220 is set to a 'locked' state. Moreover, a value of '2' is indicative of a violation by the peripheral processor CPU; a value of '3' is indicative of a violation by a first DMA unit; a value of '4' is indicative of a violation by a second DMA unit and so forth. More bits can be defined by the vendor of the peripheral processor in order to precisely define which unit (e.g., CPU, DMA, etc.) of the peripheral processor caused the memory violation/illegal access attempt. For example, this field can be modified so as to capture other implementation-specific identifiers such as an exemplary Advance eXtensible identifier (AXID), etc.

The violation type field 246 is utilized to identify the type of violation that has occurred. For example, in the context of an exemplary '1' bit field length for the violation type field 246, a value of '0' can be used to signify a read violation of the host memory, while a value of '1' can be used to signify a write violation of the host memory. The error bit(s) field 244 is utilized in order to determine the number of errors detected. For example, in the context of an exemplary '2' bit field length for the error bit(s) field, a value of '00' indicates no errors; a value of '01' indicates a single violation that has been detected by the peripheral; a value of '11' indicates that multiple violations were detected (e.g., the detection of both a read and a write violation to the same memory address, etc.). In one exemplary embodiment, the value of '10' is unused as there is no need to track any additional types of errors within the error bit(s) field. In other embodiments, the value of '10' may be used to track other types of errors, statuses, or conditions (e.g., internal errors, successful recovery, internally hung/unknown state, etc.) Exemplary implementations for the HMAP window register 210; the HMAP window configuration register 220; and the HMAP violation register 240 are included within APPENDIXES A, B and C, respectively.

In one embodiment, the peripheral processor exposes the HMAP window register 210, the HMAP window configuration register 220, and the HMAP violation register 240 to the host processor via a configuration space. By allowing these registers to be located within a configuration space, the host processor has the ability to write to these registers as early as possible during the boot process of the peripheral processor as part of, for example, the Peripheral Component Interconnect Express (PCIe) enumeration process. Moreover, the updating of the HMAP registers dynamically can result in race condition (i.e., when both processors attempt to update the registers at the same time, resulting in an unknown condition). Hence, mechanisms to update these registers may be defined by a specific protocol or other alternative means so as to avoid access contention and/or race conditions. Generally speaking, it is anticipated that the host software will update the HMAP window registers once upon initial start-up, although it is appreciated that the aforementioned HMAP window registers may in certain implementations be updated on a dynamic basis.

Finally, it is appreciated that within the context of PCIe, transaction layer packets (TLP) contain a maximum packet size (MPS) as a number of bytes. Accordingly, when a given peripheral processor attempts to access host memory, the start address of a TLP may occur within a defined HMAP window register while the end address of the TLP may occur outside of the defined HMAP window register. Therefore, it is appreciated that in certain implementations both the start and end address for a given TLP should be checked to ensure that the entire memory address for a given TLP falls within a defined HMAP window. However, in alternative implementations and/or under different design constraints (e.g., performance, reduced size/silicon, etc.), a given TLP may only be checked based on the starting address of the TLP packet or some other specific transaction scenario/condition, etc. Generalized methodologies for using the aforementioned HMAP registers are now described.

Methods

Figure 3:
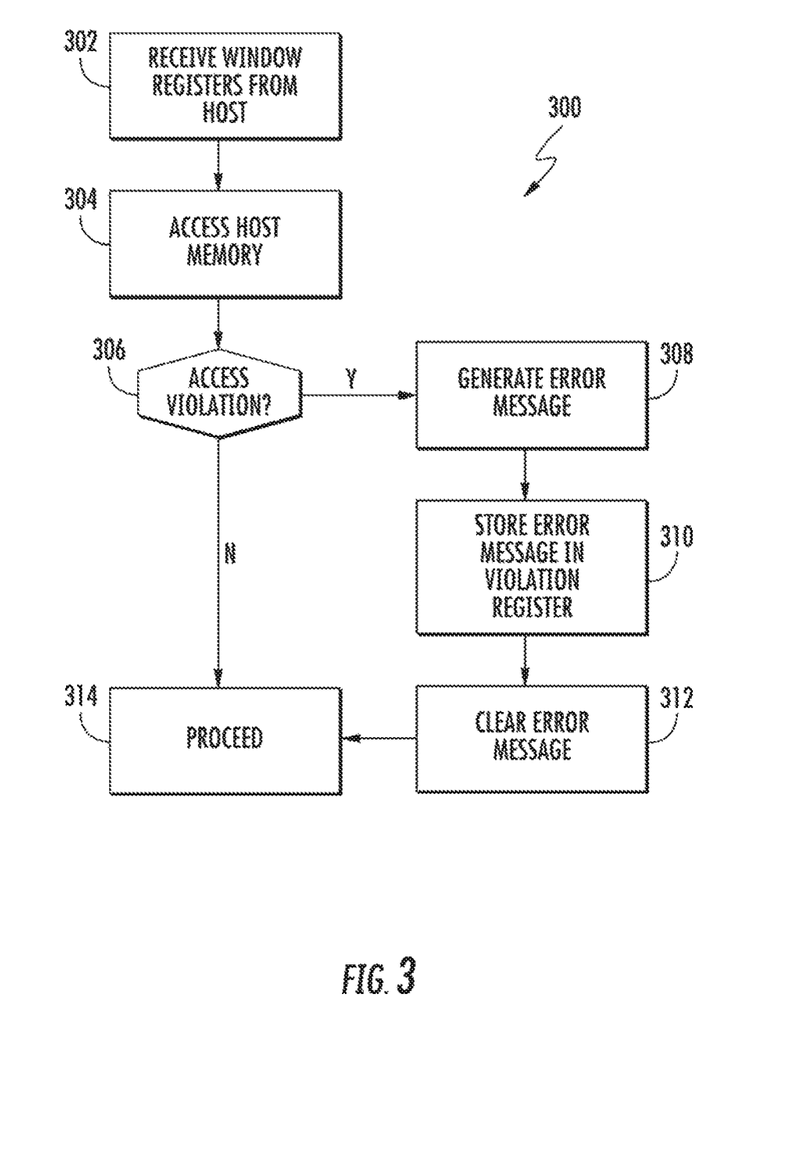
FIG. 3 is a logical flow diagram illustrating a generalized method for registering access violations of host memory in accordance with the principles of the present disclosure.

Referring now to FIG. 3, a generalized method for registering access violations of host memory 300 is illustrated. At step 302, the peripheral processor receives window registers from the host processor that are indicative of the extent of host memory that is accessible by the peripheral processor. At step 304, the peripheral processor attempts to access an address space within host memory according to normal transactions and at step 306, the peripheral processor determines whether the accessed address space violates the defined window registers received at step 302. If the access attempt does not result in an access violation, the methodology proceeds to step 314 where the host memory is accessed (e.g., a read operation, a write operation, etc.).

If however, the access attempt does result in an access violation, then the peripheral processor generates an error message at step 308. In one embodiment, this error message will include one or more of: a memory address for the violation, a source for the violation, a type of the violation (e.g., a write violation, a read violation, etc.) and/or the type of error that has occurred.

At step 310, the generated error message is stored in a violation register. In one embodiment, the violation register is of the form illustrated in FIG. 2C. Subsequent to a register access violation, the peripheral processor will not attempt to access host memory until the host processor clears the error message at step 312. After the error message has been cleared, the peripheral processor may resume operation at step 314.

Figure 4:
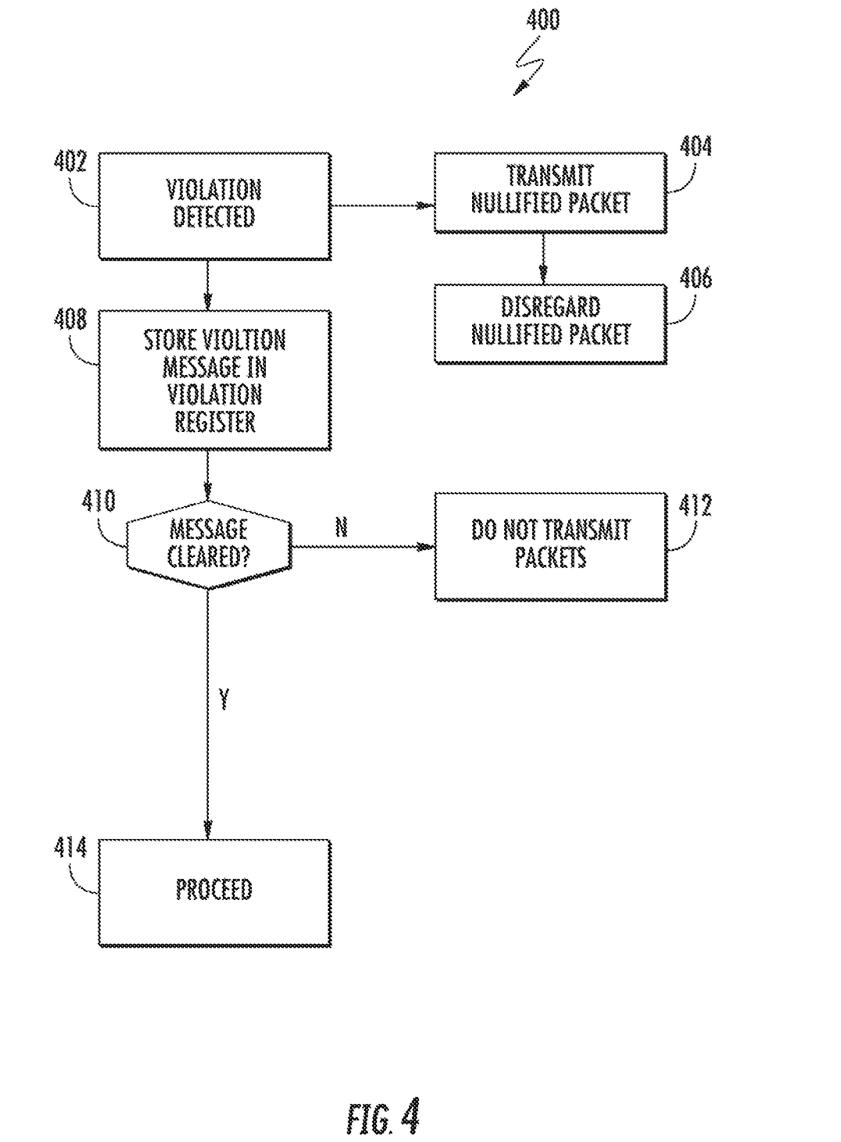
FIG. 4 is a logical flow diagram illustrating a generalized method for handling detected violations of host memory in accordance with the principles of the present disclosure.

Referring now to FIG. 4, a generalized method for handling detected violations of host memory 400 is illustrated. At step 402, an access violation is detected by the peripheral processor resulting from a violation of an address space described by the window registers. At step 404, a nullified packet is transmitted from the peripheral processor to the host. In one embodiment, the nullified packet consists of a TLP that contains an inverted data link layer cyclic redundancy check (LCRC) value. Upon receipt of this nullified packet, the host processor will disregard the nullified packet at step 406. In the exemplary context of PCIe, the packet with the inverted LCRC value will be dropped at the root complex of the host processor. In other words, the TLP will be dropped by the root complex without being flagged as an error.

Either contemporaneously with step 404, or alternatively at a time other than the transmission of the nullified packet, the peripheral processor will store a violation message within a violation register. In one embodiment, the violation register is of the form illustrated in FIG. 2C. At step 410, the violation register is checked in order to see if the violation message has been cleared and if not, the peripheral processor will not transmit any additional packets at step 412. If the violation register has been cleared at step 410, the peripheral processor will continue on at step 414.

In the exemplary context of PCIe, any subsequent TLP generation will be suspended upon the detection of a violation at step 402. As part of the error handling process, the peripheral processor will generate an internal error trap which will run a software error handler. As part of this error handling procedure, peripheral software will clear the error bits and resume peripheral processor operation. It is important that hardware operation resume normal operation so that the host software can collect debugging information if necessary without resetting/rebooting the peripheral processor. In such instances in which violations of host memory are detected, the peripheral processor is not expected to generate a link down or completion time out, etc. for detection of an address violation. Any PCIe bus level error (e.g., credit loss, etc.) are not expected upon detection of a memory access violation and the root complex at the host processor is expected to be unaware of the memory access violation. Additionally, the peripheral processor is not expected to access the link and update any host memory to report the error.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

APPENDIX A

| Bits | Field | Description |
| --- | --- | --- |
| | HMAP WINDOW REGISTER | |
| 127:96 | Reserved | Reserved for future use |
| 95:64 | Window Length | Host usage: Read/Write Peripheral usage: Read/Write (optional) Reset value = 0 This is 32 bit window length programmed by the host or peripheral software to reflect the size of window that can be accessed by the hardware. Window length shall be multiple of 512 bytes for easier hardware implementation. Window is valid when window length field is non zero. |

APPENDIX A-continued

HMAP WINDOW REGISTER

| Bits | Field | Description |
|---|---|---|
| 63:0 | Base Address | To update the window length steps would be,<br>Clear the window length = 0<br>Set the new Base address<br>Set the length to a value > 0<br>Host usage: Read/Write<br>Peripheral usage: Read/Write (optional)<br>Reset value = 0<br>This is a register programmed by the host or peripheral software to reflect the base address of the window that can be accessed. Base address shall be aligned to 4K for easier hardware implementation. Since Write capability by peripheral is optional, it is left up to implementation to treat this as error for trapping any potential write |

APPENDIX B

HMAP WINDOW CONFIG REGISTER

| Bits | Field | Description |
|---|---|---|
| 31:17 | Reserved | Reserved for future use |
| 16 | WindowWrite-ErrorEnabled (lock bit) | Host usage: Read/Write<br>Peripheral usage: Read Only<br>Reset value = 0<br>If this is set to 1, Peripheral shall treat any write in "HMAP Window Register" as error. Purpose of this bit is to freeze the state of programmed windows and trap any further access. Host can optionally choose to not enable this feature. Default reset value of this field is 0 which means that this protection is disabled.<br>Note that once this bit is set to 1, Host will have to clear this bit before making any updates to the "HMAP Window register". |
| 15:8 | Number of HMAP windows enabled | Host usage: Read/Write<br>Peripheral usage: Read Only<br>Reset value = 0<br>Host shall write this register to program number of windows enabled by the host. By default reset value of this field is 0 which means that HMAP window registers are disabled |
| 7:0 | Number of HMAP windows available | Host usage: Read Only<br>Peripheral usage: Read/Write<br>Peripheral shall define the number of windows available. Host will read this register to program the number of windows available. |

APPENDIX C

HMAP VIOLATION REGISTER

| Bits | Field | Description |
|---|---|---|
| 127:83 | reserved | Reserved for future use |
| 82:81 | error | Host usage: Read Only<br>Device usage: Read/Write<br>00 - No errors<br>01 - peripheral has detected a violation<br>10 - Undefined<br>11 - Multiple violations detected |
| 80 | violation type | Host usage: Read Only<br>Device usage: Read/Write<br>1 = write violation to Host DRAM<br>0 = read violation to Host DRAM |
| 79:64 | violation source | Host usage: Read Only<br>Device usage: Read/Write<br>0 = Reset (no violation)<br>1 = Register write<br>2 = Violation by CPU<br>3 = Violation by DMA1<br>4 = DMA2 etc.<br>More bits can be defined by vendor to precisely find which DMA or CPU caused the memory violation. This field can be repurposed to capture information such as AXID initiator ID etc. which is implementation dependent.<br>Note that definition of 'register write' is to detect the violation of lock bit. If lock bit defined in HMAP window config register (referred as WindowWriteErrorEnabled) is set, any update to HMAP window register via software will generate a violation unless the WindowWriteErrorEnabled is cleared. |
| 63:0 | MemoryAddress | Host usage: Read Only<br>Device usage: Write Only<br>Address that was caught during violation. This field is '0' by default. |

What is claimed is:

1. A method for providing access to a shared memory resource, comprising:
during a boot process of a second processor:
generating, by a first processor, a first window register value associated with the shared memory resource;
transmitting the first window register value from the first processor to a window register of the second processor, the first window register value defining a first extent of address space within the shared memory resource that is directly accessible by the second processor; and
wherein the first extent of address space is mapped to a memory map of the second processor during the boot process.

2. The method of claim 1, wherein the generation of the first window register value comprises:
generating, by the first processor, a base address that corresponds to a starting location within the shared memory resource; and
generating, by the first processor, a window length that corresponds to the first extent of address space within the shared memory resource from the starting location within the shared memory resource.

3. The method of claim 1, further comprising:
generating, by the first processor, a second window register value associated with the shared memory resource; and
transmitting the second window register value from the first processor to the second processor, the second window register value defining a second extent of address space within the shared memory resource that is directly accessible by the second processor.

4. The method of claim 1, further comprising:
responsive to an attempt to access an extent of address space outside of the first extent of address space, receiving a nullified packet transmitted by the second processor.

5. The method of claim 4, wherein the reception of the nullified packet by the first processor, further comprises receiving an inverted data link layer cyclic redundancy check (LCRC) value for the nullified packet.

6. The method of claim 4, wherein upon reception of the nullified packet by the first processor, disregarding the nullified packet.

7. A computing device comprising a memory mapped system, the computing device comprising:
a host processing device comprising a host central processing unit (CPU) and a host memory management unit (MMU);
a peripheral processing device comprising a peripheral CPU, a peripheral MMU, peripheral memory and a peripheral direct memory access (DMA) unit; and
a host memory accessible by both the host processing device and the peripheral processing device;
wherein the host processing device further comprises logic configured to:
generate a first window register value associated with the host memory;
transmit the first window register value from the host processing device to the peripheral processing device, the first window register value defining a first extent of address space within the host memory that is directly accessible by the peripheral processing device and that prevents write access of the first extent of address space within the host memory by the host processing device.

8. The computing device of claim 7, wherein the first window register value is defined by the host processing device during a boot process for the peripheral processing device.

9. The computing device of claim 7, wherein the first window register value comprises both: (1) a base address, and (2) a window length, the base address and the window length configured to define the first extent of address space within the host memory.

10. The computing device of claim 7, wherein the memory mapped system further comprises a window configuration register, the window configuration register configured to be read and/or written by the host processing device and the peripheral processing device.

11. The computing device of claim 10, wherein the window configuration register further comprises an available window field and the peripheral processing device is further configured to write a value into the available window field; and
wherein the host processing device is further configured to read the value in the available window field, the read value being utilized by the host processing device in order to determine whether the host processing device should write a value to a windows enabled field of the window configuration register.

12. The computing device of claim 11, wherein the host processing device is further configured to write a default value to the windows enabled field of the window configuration register, the default value being indicative of a legacy peripheral processing device that is incompatible with support of one or more window registers.

13. The computing device of claim 10, wherein the host processing device is further configured to write to one or more locking bits of the window configuration register, the one or more locking bits configured to prevent an update of any fields located within one or more window registers.

14. A peripheral processing device configured to access host memory within a memory mapped system, the peripheral processing device comprising:
a peripheral central processing unit (CPU), a peripheral memory management unit (MMU), a peripheral memory and a peripheral direct memory access (DMA) unit and further comprising logic configured to:
receive a first window register value from a host processing device during a boot process of the peripheral processing device, the first window register value defining a first extent of address space within the host memory resource that is directly accessible by the peripheral processing device and is not write accessible by the host processing device.

15. The peripheral processing device of claim 14, further comprising logic configured to:
expose a capability register which the host processing device can access, the capability register comprising a windows enabled field and a windows available field.

16. The peripheral processing device of claim 15, further comprising logic configured to:
write a first value into the windows available field, the first value comprising a maximum number of windows supported by the peripheral processing device.

17. The peripheral processing device of claim 16, further comprising logic configured to:
read a second value from the windows enabled field, the second value indicating to the peripheral processing device a number of windows enabled by the host processing device.

* * * * *